United States Patent
Pairone et al.

(10) Patent No.: US 6,715,925 B2
(45) Date of Patent: Apr. 6, 2004

(54) ANNULAR ELEMENT FOR A ROLLING BEARING

(75) Inventors: Gianfranco Pairone, Turin (IT); Francesco Gallucci, Nichelion (IT)

(73) Assignee: SKF Industrie S.P.A., Turin (IT)

( * ) Notice: Subject to any disclaimer, the term of this patent is extended or adjusted under 35 U.S.C. 154(b) by 0 days.

(21) Appl. No.: 10/254,173

(22) Filed: Sep. 24, 2002

(65) Prior Publication Data
US 2003/0059143 A1 Mar. 27, 2003

(30) Foreign Application Priority Data
Sep. 25, 2001 (IT) .................................... TO2001A0913

(51) Int. Cl.⁷ ............................................. F16C 19/06
(52) U.S. Cl. .................. 384/536; 384/537; 384/255; 384/903
(58) Field of Search ................. 384/537, 585, 384/903, 536, 582

(56) References Cited

U.S. PATENT DOCUMENTS

| 3,832,024 A | 8/1974 | Nishikawa |
| 4,925,322 A | 5/1990 | Hishida |

FOREIGN PATENT DOCUMENTS

| EP | 0 972 958 A2 | 1/2000 |

*Primary Examiner*—Lenard A. Footland
(74) *Attorney, Agent, or Firm*—Merchant & Gould, P.C.

(57) ABSTRACT

An annular element for a rolling bearing comprises a cylindrical surface around the circumference of which a groove, the radial and axial depth of which are variable around the circumference, is formed. The cylindrical surface is suitable for being over-molded with a plastics material to form a body which is fixed firmly for rotation with the annular element and has a plastics projection complementary with the groove. The projection can cooperate with the groove to prevent relative rotation between the annular element and the body.

13 Claims, 2 Drawing Sheets

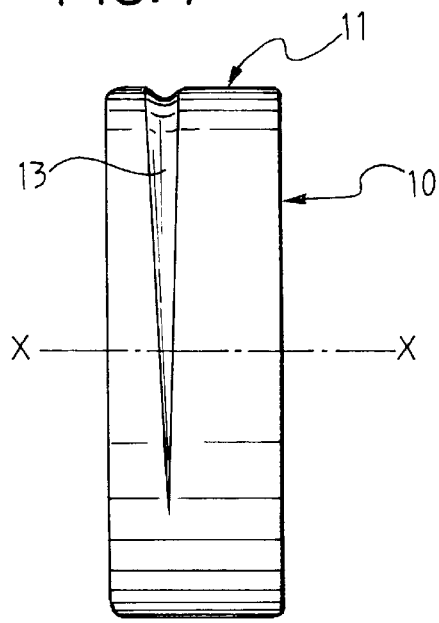
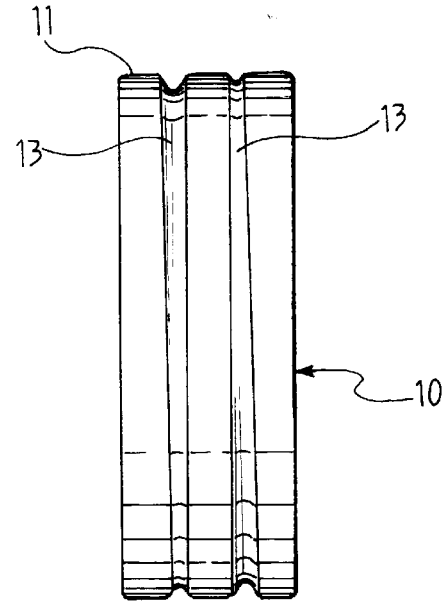
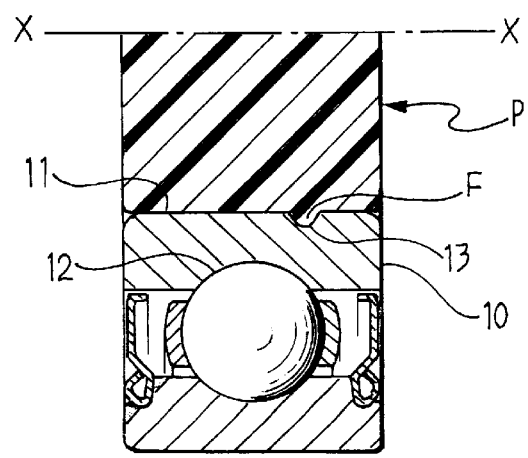

ANNULAR ELEMENT FOR A ROLLING BEARING

The present invention relates to an annular element for a rolling bearing, of the type comprising a cylindrical surface in which a groove having a radial depth which is variable around the circumference of the cylindrical surface is formed, the surface being suitable for being over-moulded with a plastics material to form a body which is fixed for rotation with the annular element and has a plastics projection complementary with the groove and suitable for cooperating with the groove to prevent relative rotation between the annular element and the plastics body.

Annular elements of the above-mentioned type are known, for example, from EP-A-0 972 958, U.S. Pat. No. 3,832,024, and U.S. Pat. No. 4,925,322. These publications describe bearings having rings which have eccentric grooves with rectangular axial sections.

A disadvantage which arises when a plastics body is moulded over an annular element of a rolling bearing is due to the fact that, because of the different coefficients of thermal expansion of steel and plastics, the plastics body tends to rotate slowly relative to the ring of the bearing; this phenomenon is known by the term "creeping". The relative rotation between the plastics and the steel of the bearing causes rapid wear of the plastics due to friction so that the assembly becomes noisy and is inevitably subject to excessive vibrations and breakage.

A general object of the present invention is to provide an annular element of the above-mentioned type which more effectively prevents relative rotation between the annular element and the plastics body moulded over it.

A particular object of the invention is to provide an annular element for a rolling bearing which is suitable for supporting a rotating shaft of a drum in a washing machine without incurring the problems mentioned above, and which is specifically adapted to prevent the vibrations caused by the rotation of the drum from reaching unacceptable values.

These objects are achieved, according to the present invention, by an annular element.

Figure 1:
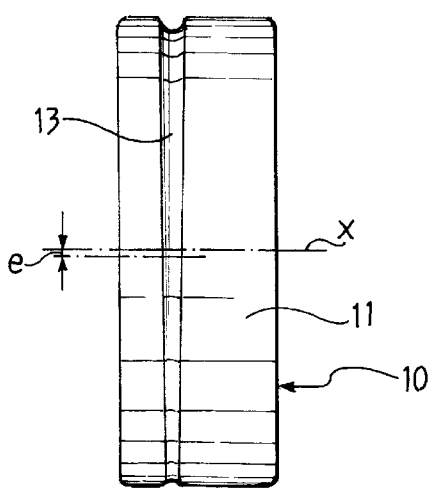
Figure 2:
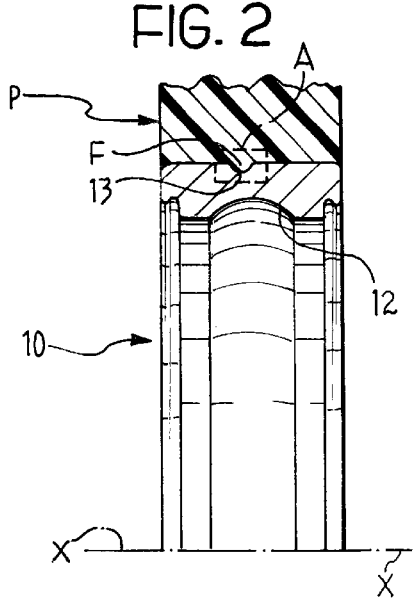
Figure 3:
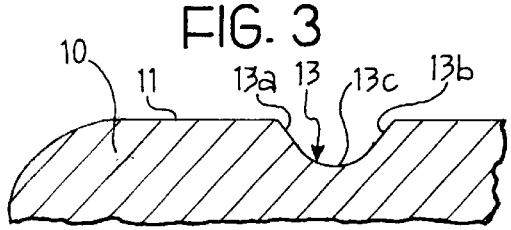
Figure 4:
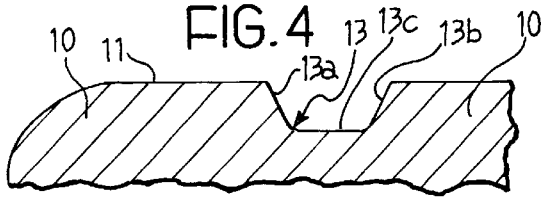
Figure 5:
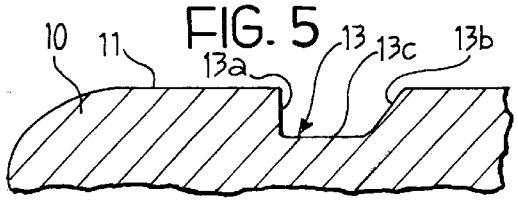
Figure 6:
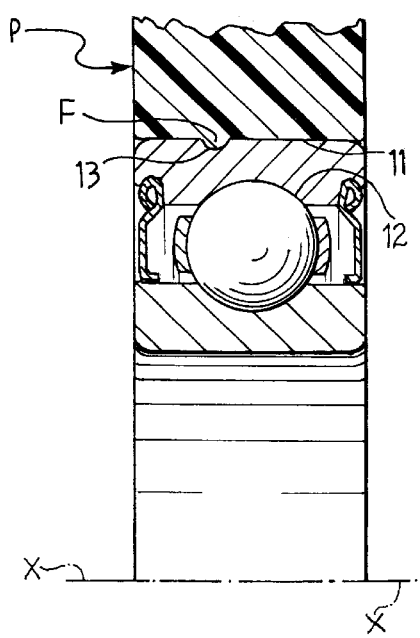

Some preferred embodiments of the invention will now be described, purely by way of non-limiting example, with reference to the appended drawings, in which:

FIG. 1 is a side view of a bearing element according to the present invention,

FIG. 2 is an axially-sectioned partial view showing, on an enlarged scale, the bearing element of FIG. 1 over which a plastics body is moulded, FIG. 3 is an enlarged view of the detail indicated A in FIG. 2, FIGS. 4 and 5 are views similar to FIG. 3 which show a further two variants of the invention, FIG. 6 is an axially-sectioned partial view similar to FIG. 2 which shows a complete bearing over the outer ring of which a plastics body is moulded, FIGS. 7 and 8 are views similar to FIG. 1, showing two further embodiments of the invention, and FIG. 9 is an axially-sectioned partial view which shows a bearing over the inner ring of which a plastics body is moulded.

With reference initially to FIG. 1, an annular element constituting the radially outer ring of a rolling bearing is indicated 10. The annular element 10 has an outer cylindrical surface 11 and a raceway 12 on its inner surface.

Throughout the present description and in the claims, terms and expressions indicating positions and orientations (such as "radial", "axial", "inner, "outer") are intended to relate to the central axis x of the annular element 10.

As shown in FIGS. 2 and 6, a body P of plastics material is moulded over the outer cylindrical surface 11 and constitutes a fixed housing for supporting the bearing. The plastics body P may be a support element mounted in a washing machine for supporting rotatably, by means of the bearing, a rotary shaft on which the drum of the washing machine is fixed. Naturally, the reference to this possible field of application should not be interpreted as in any way limiting of the scope of the patent. For example, the annular element 10 may be used for a bearing over which a pulley of plastics material is moulded, in particular for use as a belt tensioner in motor-vehicle engines.

A radial groove 13 which is eccentric with respect to the central axis x of the element 10 (with an eccentricity "e" indicated in FIG. 1) is formed in the outer surface 11 of the annular element 10 by means of a simple turning operation.

The over-moulding of the plastics material which constitutes the outer body P produces a circumferential projection F of plastics material which extends radially inwardly and is complementary with the groove 13. A form fit is thus created which locks the outer body P and the annular element 10 of the bearing together firmly, preventing their relative rotation in a circumferential direction. In fact, if, after some time, the plastics material moulded over the bearing no longer adheres to the steel of the outer ring 10 of the bearing, the eccentric projection F will press tangentially against the groove 13 so that relative rotation between the outer annular element 10 of the bearing and the outer body P will be prevented.

An important characteristic of the present invention is that the axial width of the groove 13 varies around its circumference, as shown in FIG. 1.

With reference to FIG. 3, the groove 13 has a substantially V-shaped cross-section with two opposed lateral walls or surfaces 13a, 13b diverging from the base 13c of the groove towards the cylindrical surface 11. Should the annular element tend to rotate relative to the body P in which it is housed, the projection F will be wedged between the surfaces 13a and 13b which will cooperate with the projection F to prevent relative rotation between the body P and the annular element 10.

This effect is additional to the locking effect achieved by the eccentricity of the groove, considerably improving effectiveness in comparison with the conventional solutions discussed in the introductory part of the present description which, instead, have an eccentric groove with a rectangular cross-section the lateral surfaces of which do not contribute to the locking.

FIGS. 4 and 5 show schematically, purely by way of example, further alternative embodiments of the invention. In FIG. 4, the groove 13 has a substantially isosceles trapezoidal cross-section, and in FIG. 5 it has a substantially right-angled trapezoidal cross-section.

Naturally, persons skilled in the art will also be able to identify other shapes (for example, round) for the cross-section of the groove 13, which are equivalent to those described herein and are characterized by a variation both of the axial width and of the radial depth of the groove around its circumference.

With reference now to FIGS. 1 and 2, in order not to weaken the ring 10, the groove 13 is preferably formed in a lateral region in which the ring is quite thick and not in the region of the maximum diameter of the raceway 12 in which, on the contrary, the radial thickness is least.

The groove 13 may have a diameter considerably less than that of the cylindrical surface 11, as in the embodiment shown in FIGS. 1 and 2, so as to extend continuously around the circumference of the ring.

In the variant shown in FIG. 7, the groove 13 extends merely along a circumferential arc so as to reach the surface tangentially at a point or along a sector of the outer surface 11, in any case achieving a form fit with results equivalent to those offered by the other embodiments described herein.

In the embodiment of FIG. 8, two grooves 13 are provided, spaced apart axially and preferably angularly offset relative to one another in order further to improve the rotational locking effect of the annular element 10 relative to the body P in both senses of rotation.

Finally, FIG. 9 shows a further different embodiment of the invention in which the annular element 10 is a radially inner ring of a bearing with an inner cylindrical surface 11 which has an eccentric groove 13 having the characteristics described above with reference to any one of FIGS. 1 to 8. In FIG. 9, a plastics body P is over-moulded on the inside of the surface 11, producing a projection F extending radially outwards.

What is claimed is:

1. An annular element for a rolling bearing, comprising a cylindrical surface in which at least one groove having a radial depth which is variable around the circumference of the cylindrical surface is formed, the surface being suitable for being over-moulded with a plastics material to form a body which is fixed firmly for rotation with the annular element and has at least one plastics projection complementary with the groove and suitable for cooperating with the groove to prevent relative rotation between the annular element and the body,
wherein the axial width of the groove varies around the circumference.

2. The annular element of claim 1, wherein the groove has two opposed lateral surfaces diverging from the base of the groove towards the cylindrical surface.

3. The annular element of claim 1, wherein the groove is eccentric with respect to the axis of the cylindrical surface.

4. The annular element of claim 1, wherein the groove has a substantially V-shaped cross-section.

5. The annular element of claim 1, wherein the groove has a substantially isosceles trapezoidal cross-section.

6. The annular element of claim 1, wherein the groove has a substantially right-angled trapezoidal cross-section.

7. The annular element of claim 1, wherein the groove is offset axially relative to the regions of minimum radial thickness in which the annular element has raceways.

8. The annular element of claim 1, comprising two axially spaced-apart grooves, the axial widths of which vary around the circumference.

9. The annular element of claim 8, wherein the two grooves are angularly offset relative to one another.

10. The annular element of claim 1, wherein the annular element is a radially outer ring of a bearing and in that the at least one groove is formed in the outer cylindrical surface of the annular element.

11. The annular element of claim 1, wherein the annular element is a radially inner ring of a bearing and in that the at least one groove is formed in the inner cylindrical surface of the annular element.

12. The annular element of claim 1, wherein the groove extends continuously around the cylindrical surface.

13. The annular element of claim 1, wherein the eccentric groove extends around a circumferential arc of the cylindrical surface.

* * * * *